(No Model.)
A. SWEETLAND.
COMBINED POTATO AND CORN PLANTER.
No. 568,639. Patented Sept. 29, 1896.
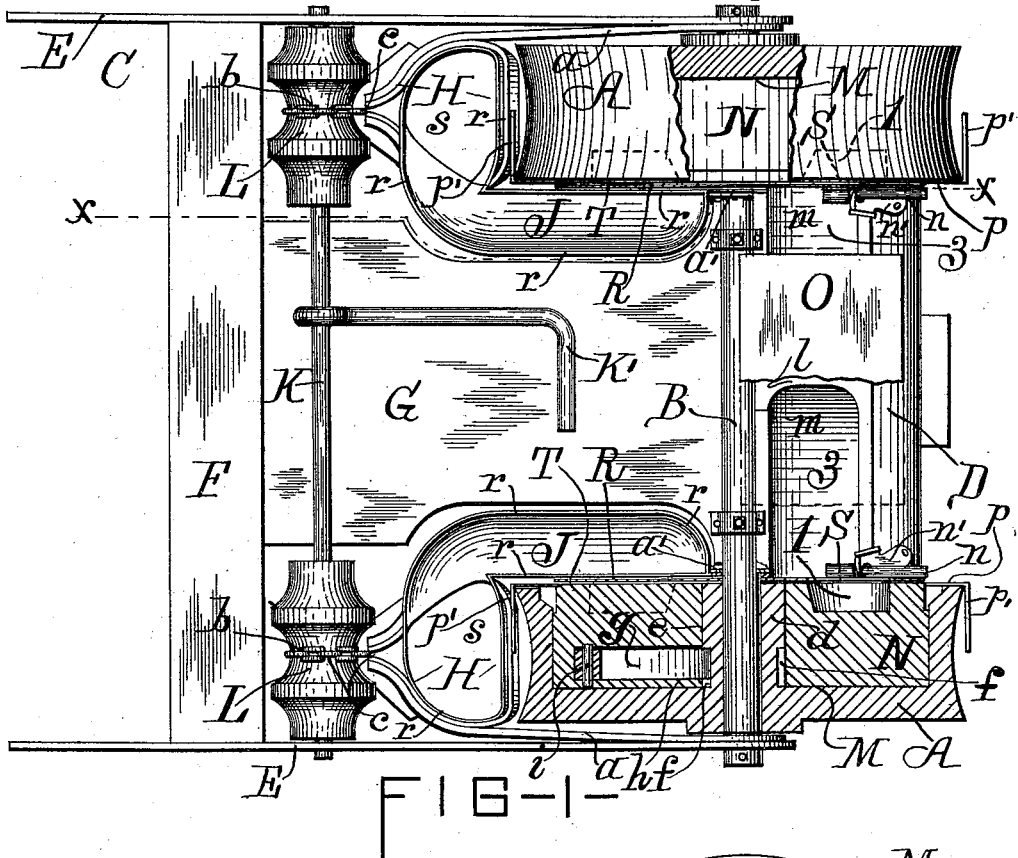
FIG-1-
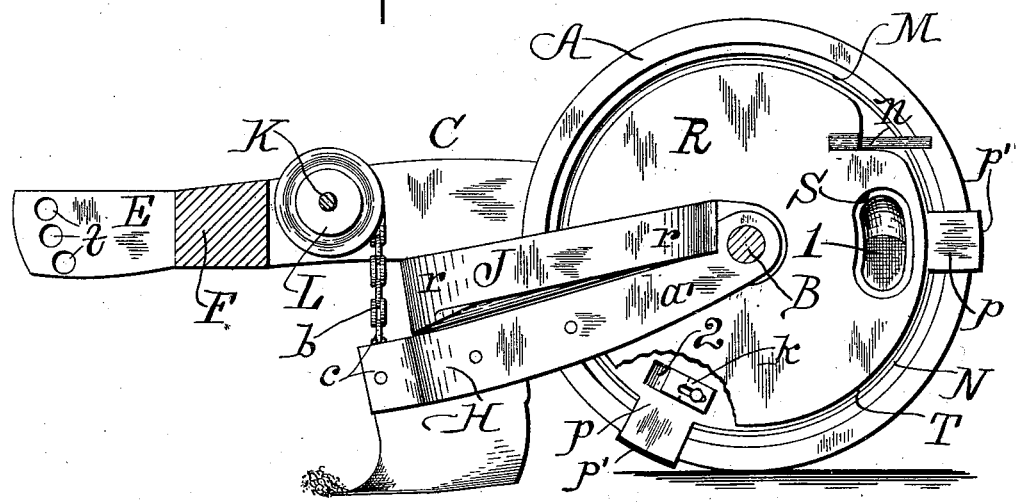
FIG-2-
ATTEST—
Conrad Schoneck
O. Faukemoeller
INVENTOR—
Alvah Sweetland
By Aem. C. Raymond
his Atty.

UNITED STATES PATENT OFFICE.

ALVAH SWEETLAND, OF MEMPHIS, NEW YORK.

COMBINED POTATO AND CORN PLANTER.

SPECIFICATION forming part of Letters Patent No. 568,639, dated September 29, 1896.

Application filed September 19, 1895. Serial No. 562,963. (No model.)

*To all whom it may concern:*

Be it known that I, ALVAH SWEETLAND, a citizen of the United States, residing at Memphis, in the county of Onondaga and State of New York, have invented certain new and useful Improvements in a Combined Potato and Corn Planter; and I do hereby declare the following to be a full, clear, and exact description of the invention, such as will enable others skilled in the art to which it appertains to make and use the same, reference being had to the accompanying drawings, in which—

Figure 1 is a top plan of my combined potato and corn planter with portions thereof represented broken away and sectional for the clearer showing of certain essential parts; and Fig. 2 is a longitudinal sectional elevation, on a vertical plane, of said planter as taken along dotted line $x$ $x$, Fig. 1.

Like letters and figures of reference denote corresponding parts.

My invention relates, broadly, to that class of agricultural machinery known as "planters" or "planting-machines," while, specifically, it has direct reference to that subdivision of the class aforesaid denominated as "seed-planters" and designed for the sowing of large seed, such as potatoes or other tubers, or corn and other small seeds or kernels, deposited in the soil either in hills or drills and sown in parallel rows at a planting.

Directly my invention has reference to that subdivision of seeding-machines known as "combination seed-planters" and adaptable for utilization for the planting of large or small seed, as desirable, and dispensing with the necessity of using separate and differentially-constructed machines for the distributing of large and small seeds.

The object of my invention is the production of a combination-planter of ready adaptation for the planting of potatoes or other large seed or corn or other small kernels, one kind or the other to be sown at a time and deposited in hills, spaced intervals, or drills, as preferred, and operating for double parallel rows at a time; furthermore, novel means for the gaging of the points for seed-distribution, that the hills or drills may be located at agreeing distances; in novel means for the carrying of the grain from the hoppers or reservoirs to and into the furrows created by the plowshares; in suitable means for the stoppage of distribution at those periods when the machine is being turned about to start on other rows, and, finally, in certain details of construction, arrangement, and coöperativeness of parts insuring efficient and reliable operation of the planter.

My invention consists in the novel features of formation, combination, and operation hereinafter described, and which are specifically stated in the clauses of claim hereunto annexed.

Referring to the accompanying drawings, A A indicate drive wheels or rollers located at a distance apart and revoluble on a transverse horizontal axle B, secured stationary to the frame C of the planter by any suitable means; D, the hopper-body for the reception of the seed to be sown, said hopper being, in fact, a portion of the planter's frame and located rearward of the axle B in such horizontal position as to stand transversely across from near proximity to the inner side of one drive-wheel to the companion wheel.

E E are elongated horizontally-located side bars journaled on outstanding ends of the axle B contiguous the outer sides of the respective drive-wheels; F, a forward cross-bar extending from one side bar to the other adjacent their front ends and firmly connected therewith; G, a central and horizontal platform extending longitudinally from the aforementioned cross-bar to the hopper-body D, contiguous its bottom and firmly connected therewith and the cross-bar.

H H are hollow-formed plows located, respectively, just forward of the drive and roller wheels A A and directly fronting them and sufficient clearance allowed for proper working of said plows between the outer edges of the platform and the side bars E. Rearwardly the plows terminate at their upper portions in enlongated grain or seed conveyers J J, integral with or connected with the plows and pivotally connected to the rearward axle B by means of extended side strips or plates $a$ $a'$, respectively, pivotally attached thereto just outside and inside the drive wheels or rollers A A.

K is a transversely-disposed horizontal shaft or rod located just in the rear of the cross-bar F and preferably above the platform of the machine and suitably journaled in the side bars E E, the said shaft having keyed thereto directly ahead of the plows spools L L, whereto chains $b\,b$ are respectively secured, the said chains extending downward and suitably connected to the upper forward portion of the plow-beam to which it pertains, as indicated at $c\,c$, the function of said-mentioned shaft K being, through the rotation given thereto by the raising or lowering of its rigidly-attached handle K', to raise or lower concurrently the companion plows, and thereby regulating the depth of the furrows or channels in the soil according to what depth of furrowing is the most desirable or advantageous for the correct planting of the seed to be sown by the planter on any specific occasion.

As noticeable, the periphery or tread of the respective drive-wheels A is slightly concave and adapting same to secure a firm foothold on the earth and flatten the earth falling back on the sown seeds through the action of the advance plows. Each drive-wheel has an annular-like chamber M, opening toward the inner faces thereof, the result being to create shell-like wheels having a central hub $d$, adapted to turn on the axle B. Within the annular cavity or chamber of each of said drive-wheels there is an annular-shaped seed carrier or feeder N, movably fitting within the chamber and journaled by means of central opening or bore $e$ upon the hub $d$ of the drive-wheel. Ratchet-teeth $f$ are on the hub $d$, extending around it at that point where it merges into the shell of the wheel, and $g$ is a spring-pawl engaging in one direction invariably with the ratchet-teeth and preventing any revolution of the carrier member N in an undesired direction, said pawl being retained in a mortise $h$ in the carrier N by a pintle $i$, secured in the carrier-body.

The function of aforestated spring-pawl engaging with the ratchet-teeth of the hub $d$ is not only to insure normally the rotation of the carrier disk or ring N coincidently with the revolution of and same degree as the inclosing drive-wheel, but permitting, as soon to be described, the rotating in a forward direction of the carrier while the drive-wheel is remaining stationary; furthermore, absolutely preventing the reverse revolution of the carrier within its inclosing drive-wheel A.

The carriers N pertaining to the drive-wheels are provided at their oppositely-disposed circular faces with seed-carrying cavities or "pockets," entering into the body of the carriers, one of the pockets (or series) being of a capacity and contour to contain and carry a requisite degree, one, two, or more, large seed, such as potatoes, &c., such a pocket being exemplified at 1, while the other pocket (or series) is of much smaller size and different contour and only adaptable for the reception and carrying of small seed or kernels, such as corn, &c., that character of pocket being exemplified at 2. The potato-pocket is preferably flat at its inward termination and at its forward end portion is inclined, that the potatoes or other large seed may invariably be precipitated out of the pocket when said pocket is carried around to that spot whence same are to drop into the conveyer-trough J, discharging into the rear of the plow-point.

When it is desired to utilize the planter for the sowing of corn or small grain in lieu of potatoes or other large seed or tubers, the large carrying-pocket 1 is closed against access of seed from the hopper by means of a plug P, inserted therein from the outside and snugly fitting the said cavity or other preferred common means, and, as is obvious, when potatoes and other large seed are to be planted the plug or its equivalent is displaced, permitting access of and carrying of such large seed or tubers by the pocket.

The small corn-pocket 2, suitably beveled at an end, is provided with a slide $k$ for adjusting the capacity of the pocket to that quantity of small seed desirable to the user. As is evident, no plug or kindred device is necessary for the corn-pocket incidental to the planting of large seed, like potatoes, as same could not enter into the little pocket.

While by way of illustration I show but one large and one small pocket to each carrier N, located within the drive-wheels A A, yet in actual usage of my planting-machine a further number of pockets would preferably be employed, say, for instance, three large pockets alternated by three small pockets and substantially equidistant apart.

The hopper D for the reception of either large or small seed, accordingly to which is to be sown, comprises two lineal reservoirs or chambers 3 3, separated midway the length of the hopper-body by a dividing-wall $l$, which seed-reservoirs are open at their top and adaptable of being partially or wholly covered by a driver's seat O, normally resting upon the hopper and capable of being swung to a side when seed are to be deposited in the hopper-reservoirs.

Obviously any desired number of pockets may be formed in the carriers of the wheels to satisfactorily fulfil requirements.

The seed-reservoirs of the hopper D are so hollowed that, longitudinally their length, their bottoms have a gradual downward slant toward the carrier N of the contiguous wheel, as indicated by shading at $m\,m$, and that deep portion of the reservoirs facing the carriers is of itself open and whereby unobstructed flow of the seed therein is insured to the receiving-pockets of the carriers except when egress is closed by means soon to be described.

R R denote circular-like plates centrally pivoted to the carrying-axle B between the respective ends of the hopper-body D and the contiguous annular faces of the carriers N, which revoluble plates, serving as gates or shut-offs to the open ends of the reservoirs of the hopper, are respectively provided with a single large elongated exit-opening S of a circumference at least equal to that of the outside dimensions of the largest pocket 1, and so located in the plate that its boundary edges will encircle the pocket upon the turning of the gate-plate to that extent requisite for the coinciding of said opening S with a pocket.

Normally the gates R R are open, as illustrated in both figures of the drawings, and permitting the feeding of seed from the reservoirs of the hopper into the pockets of the carriers N, rotating concurrently with the travel of the drive-wheels, the said gate-plates being retained securely in opened positions by means of a handle $n$, held stationary by an engaging hook $n'$, pivoted to the hopper. When desired to close the gates, the respective handles are released by disconnecting the hooks mentioned, and, being grasped, the gates are turned in a forward direction sufficiently to bring a non-perforated portion in front of the discharge end of a reservoir of the hopper, stopping all feeding.

T T denote disk-shaped plates (or of other preferred form) rigidly secured to the pocket-pierced faces of the revoluble carriers N N and apertured at those points where the pockets occur in the faces of the carriers, and centrally where the axle B passes and lineal with each pocket there extend peripherally outward from the said plates markers $p$, extending out past the edges of the drive-wheels and partially (or wholly) passing transversely across their tread, as indicated at $p'$, the function of which markers is for locating the proper starting point or points for hills or drills.

It being desired to locate the starting-point of seed-planting at a special spot, a marker is grasped by the operator and the marker-plate and connected carrier revolved until a marker $p$ (with its coinciding pocket 1 or 2) is set at the proper portion of the periphery of the wheel, and thus correct distribution assured.

Obviously whatever the number of pockets in the carriers a like number of markers to a wheel are employed. Evidently on account of the pawl-and-ratchet arrangement aforementioned no retrograde revolution of the carrier or marker plate of a wheel A A is possible independent of the wheels.

While for sowing in hills a comparatively few pockets are provided to the carriers N of the drive-wheels, yet for purposes of sowing in drills the pockets would be multiplied and closer together.

As is clear, the pockets of the two feed-carriers are so located that they stand diametrically opposite to each other.

The metallic seed-conveyers J J are so constructed and disposed as to have a sufficient downward slant from their upper rearward ends, whence the seed is received from the pockets of the carriers toward their lower discharges rearward of the plow-points. The side walls $r$ of the conveyers are continuous and sufficiently high to prevent any spilling over of the seed moving therein to and through the large opening S, affording the passage of the seed, whether large or small, and its precipitation to the earth.

The moldboards of the plows H H are formed flaring at the bottom, thus allowing the dirt to fall back and cover up the seed almost concurrently with the passage of the plows. The plow-points may be of any suitable shape or contour.

The elevated extremities of the conveyers J lie on a plane slightly beneath that of the axle B, whereby, as the pockets of the carriers reach a point forward about lineal as to plane with said axle, they discharge their contents into the conveyers aforesaid.

Any suitable thills are secured to the perforated forward extremities of the side bars E E of the planter and by means of the holes $t$ suitably adjusted as to draft.

Having thus fully described my invention, what I claim as new, and desire to secure by Letters Patent, is—

1. A device of the class described, comprising a frame, a stationary axle secured thereto, drum-like drive-wheels hollowed out annularly from their inner sides and revoluble on the ends of the axle, annular-like seed-carriers revolubly disposed within the hollowed chambers of the drive-wheels, said drive-wheels adaptable to travel on the ground, and the annular carriers adapted to rotate coincidently with the inclosing drive-wheels, or independently thereof, a hopper at the rear of the frame, parallel to the axle, and having a feeding-chamber with outwardly-inclined bottom, at either side its center, and respectively capable of communication with seed-carrying pockets formed in the inner faces of the carriers, as they intermittently pass before the discharge ends of the chambers of the hopper, disk-shaped cut-off plates facing the inwardly pocket-perforated faces of the revoluble seed-carriers in juxtaposition thereto, and capable of manipulation for the stoppage of the flow of seed from the hopper into the passing pockets of the carriers, hollow-formed plows located directly in advance of the drive-wheels through pivotal connection to the extremities of the axle carrying the drive-wheels, said plows being adapted to simultaneous vertical adjustment, inclined trough-like conveyers communicating forwardly with the open interiors of the plows and rearwardly with the pockets of the carriers at their forward limit of revolution, said conveyers forwardly resting on the plow members and rearwardly pivotally secured to the axle carrying the drive-wheels, all combined and operating substantially as described and for the purposes set forth.

2. A device of the class described, comprising a frame mounted upon an axle supported by carrying drive-wheels journaled upon the ends thereof, an annular chamber extending into the respective drive-wheels from the inner circular sides, a hub to each drive-wheel extending the depth of the chamber thereof, through which hubs the carrying-axle passes, a hopper at the rear of the frame having outwardly down-slanting bottoms, said hopper at its respective discharge ends being adaptable of communication with seed receiving and carrying pockets located at suitable intervals within the inner and facing sides of annular-shaped carriers occupying the annular chambers of the respective drive-wheels and normally revoluble therewith, serrations around the hubs of the driving-wheels, spring-pawls within the carriers secured at one end thereto and their free ends engaging with the ratchet portion of the hubs aforesaid, hollow plows pivotally disposed forwardly of the drive-wheels through connection with the frame-supporting axle, means forward and above the plows capable of giving them vertical adjustment, gates movably disposed between the carriers and the hopper and pivotally secured on the carrying-axle, and trough-like conveyers forwardly connecting with the open top of the hollow plows and extending rearwardly in juxtaposition to the inner faces of the drive-wheels and contained carriers, said conveyers extending on an incline, and terminating rearwardly slightly past the points occupied by the several seed-pockets of the carriers at their forward sweep, all combined, arranged, and operating substantially as described and for the purposes set forth.

3. The combination, in a device of the class described, of a frame, a non-revoluble axle supporting same through means of carrying drive-wheels mounted revolubly on the extremities of said axle, an annular chamber opening into the respective drive-wheels from their inner facing sides, the central perforated projections forming hubs extending interiorly the wheels, and journaled on the supporting-axle aforementioned, ratchet-teeth formed in said hubs at their base portions, annular carriers movably seated in the chambers of the drive-wheels, their external faces being lineally flush with the annular edge of the inclosing wheels, recesses in the carriers containing respectively a secured spring-pawl engaging at its free end with the ratchet-teeth of the hub of the inclosing drive-wheel, pockets extending into the external faces of the carriers, at equidistant points, contiguous the periphery thereof, pivotally-movable gates facing the faces of the carriers, markers between the gates and the drive-wheels, a hopper on the rear part of the frame about midway the wheels' height and standing horizontally transverse thereto, seed-reservoirs therein communicating by slanting bottoms with the pockets of the carriers as they pass the outlets of the carriers in their rotary movement with the drive-wheels, hollow plows adjustably secured in advance of the drive-wheels, and conveyers extending from the open portions of the plows rearwardly to points contiguous the supporting-axle, and in proximity to the inner sides of the drive-wheels and contained carriers, substantially as described.

In testimony whereof I affix my signature, in presence of two witnesses, this 19th day of August, 1895.

ALVAH SWEETLAND. [L. S.]

Witnesses:
 WM. C. RAYMOND,
 MARY E. DENISON.